United States Patent
Gmelin et al.

(10) Patent No.: US 9,121,775 B2
(45) Date of Patent: Sep. 1, 2015

(54) DEVICE FOR FIXING A TEMPERATURE SENSOR

(75) Inventors: Christoph Gmelin, Stuttgart (DE); Reinhold Herrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 231 days.

(21) Appl. No.: 12/932,587

(22) Filed: Feb. 28, 2011

(65) Prior Publication Data

US 2011/0211614 A1    Sep. 1, 2011

(30) Foreign Application Priority Data

Mar. 1, 2010  (DE) .......................... 10 2010 002 480

(51) Int. Cl.
| | |
|---|---|
| G01K 1/00 | (2006.01) |
| G01K 13/02 | (2006.01) |
| G01K 7/00 | (2006.01) |
| G01K 1/14 | (2006.01) |

(52) U.S. Cl.
CPC ........ G01K 13/02 (2013.01); G01K 1/14 (2013.01); *G01K 2013/024* (2013.01); *G01K 2205/02* (2013.01)

(58) Field of Classification Search
USPC .......................................... 374/138, 208, 163
See application file for complete search history.

(56) References Cited

U.S. PATENT DOCUMENTS

| | | | | |
|---|---|---|---|---|
| 5,581,241 A | * | 12/1996 | Kaufman et al. | 340/630 |
| 5,926,098 A | * | 7/1999 | Wiemeyer et al. | 340/630 |
| 6,374,685 B1 | * | 4/2002 | Daly | 73/866.5 |
| 7,641,388 B2 | * | 1/2010 | Hayashi | 374/148 |
| 7,695,190 B2 | * | 4/2010 | Davda | 374/179 |
| 2003/0058116 A1 | * | 3/2003 | Mayusumi et al. | 340/584 |
| 2003/0071740 A1 | * | 4/2003 | Brundage et al. | 340/693.6 |
| 2004/0001006 A1 | * | 1/2004 | MacPherson et al. | 340/693.6 |
| 2004/0101031 A1 | * | 5/2004 | Kotwicki | 374/185 |
| 2007/0220984 A1 | * | 9/2007 | Slagle et al. | 73/708 |
| 2007/0242725 A1 | * | 10/2007 | Kitahara | 374/42 |

FOREIGN PATENT DOCUMENTS

| | | |
|---|---|---|
| CN | 1130940 | 9/1996 |
| DE | 197 37 420 | 1/1999 |
| JP | 01299425 A * | 12/1989 |

* cited by examiner

*Primary Examiner* — Mirellys Jagan
(74) *Attorney, Agent, or Firm* — Kenyon & Kenyon LLP

(57) ABSTRACT

In a system for attaching and fixing a temperature sensor, e.g., an NTC element, the NTC element is accommodated in a pressure connector section of a sensor housing. The area of the head of the temperature sensor is flanked and/or supported by guide vanes, which cause the incident flow in the area of the head of the temperature sensor to be accelerated.

27 Claims, 8 Drawing Sheets

DEVICE FOR FIXING A TEMPERATURE SENSOR

BACKGROUND OF THE INVENTION

1. Field of the Invention

The present invention relates to a system for fixing a sensor in a housing.

2. Description of the Related Art

Published German patent application document DE 197 31 420 A1 describes a device for detecting the pressure and the temperature in the intake manifold of an internal combustion engine and a method for manufacturing it. A temperature sensor and a pressure sensor fastened together with an evaluation circuit to a substrate with as little stress as possible are situated in a shared housing. The housing includes at least two spaces separated from one another, one of which forms a pressure space which is sealed off from the environment and is connected to the intake manifold via a connector, the part of the substrate on which the pressure sensor is attached being situated in the first space, and the second of which is used for accommodating and fastening the remaining part of the substrate having connecting elements, adhesive seals that decouple mechanical stresses being provided for sealing the pressure sensor and fastening the substrate.

NTCs (negative temperature coefficient thermistors) are frequently used for temperature measurements in pressure and air mass sensors in use today. NTCs are temperature-dependent resistors whose electrical resistance varies with temperature. NTCs normally include a smooth glass or plastic bead of approximately 1 mm to 3 mm in size and two connecting pins representing the electrical terminals.

Current response times $t_{63}$, which apply to a temperature jump from 20° C. to 80° C., at an incident flow rate of v=6 m/s and installation in the pressure connector of a commonly used pressure sensor, are between 6 seconds and 10 seconds. However, significantly shorter response times than response times $t_{63}$ of between 6 seconds and 10 seconds are frequently required.

Moreover, the NTC must have very good mechanical protection and support, since it is highly susceptible to flow-induced vibrations, and thus the mechanical loads of the connecting leads, i.e., the aforementioned two pins, become too great over the service life. In addition, the NTC must be protected against mechanical damage when the sensor is installed. To prevent the connecting leads from breaking, the NTC is protected all around in pressure and air mass sensors manufactured presently. This mechanical protection makes the heat transfer from the NTC to the ambient air very poor. On the one hand, the NTC is thermally very well connected to the thermally inert sensor housing; on the other hand, the flow through the cage that surrounds the NTC is almost completely shielded.

BRIEF SUMMARY OF THE INVENTION

An object of the present invention is to cause the flow to be specifically accelerated, resulting in a higher flow rate in the area of the NTC, accompanied by an improved heat transfer and the shorter response times resulting therefrom.

Furthermore, the thermal connection of the NTC to the sensor housing of the pressure/temperature sensor is specifically weakened or the NTC is thermally decoupled from the sensor housing.

A cage surrounding the NTC is designed in such a way that the NTC is specifically placed in a zone having high flow rates. To that end, lateral "walls" of the protective cage are provided with a droplet-shaped profile which is designed similarly to the wings of an airplane. This profile accelerates the flow locally and specifically diverts it to the head of the NTC. In addition to the flow acceleration, the NTC cage must assume an important protective function for the NTC by fixing the head of the NTC and protecting it from mechanical influences. Furthermore, an additional protective function is that the NTC is prevented from experiencing flow-induced vibrations. To fulfill these requirements, the NTC is guided and the thermal connection of the same to the housing of the sensor and the cage surrounding the NTC is simultaneously designed to be as weak as possible. This in turn makes it possible to ensure that the NTC head is only fixed via thin, peaked mandrels having extremely unfavorable heat transfer characteristics.

Another example embodiment variant is to produce a separation area on the side facing the NTC by introducing a step in a profile contour. A step in the profile preferably lies in a zone where very high flow rates already occur. This further maintains the flow at a high rate level and the distance between the brace next to the NTC and the NTC is simultaneously made larger and the thermal connection is weakened in this way.

In an advantageous refinement of the idea underlying the present invention, the pressure connector may be designed in such a way that it may be adapted to any incident flow direction. If the profiled guide vanes are used as flow accelerators, they improve the heat transfer of the temperature sensor which is in particular designed as an NTC; their effect is strongly dependent on direction. If the profiled guide vanes are positioned unfavorably, they act rather as a shielding against the incident flow and worsen the response times of the temperature sensor. This is associated with the requirement that the flow direction relative to the orientation of the pressure connector must be known precisely in advance to approximately +/−10° in each application in which guide vanes are used; on the other hand, a sensor of such design is no longer usable universally. Identical applications having different incident flow angles would inevitably require different sensor housings and accordingly high tool costs.

In order to solve this problem, a rotatable top part in the form of a guide vane head which is attached in a specific angle position during manufacturing is described as a refinement of the idea underlying the present invention. The head having the profiled guide vanes may be attached, for example, by laser welding or also by friction welding. The temperature sensor, which is in particular an NTC, is initially mounted in the pressure connector. The head having the guide vanes is then placed on the front ring area of the pressure connector and the head having the guide vanes is welded, for example, by laser welding in the form of a circumferential weld. As an alternative, the head having the guide vanes may be either laser welded or also slipped on or clipped on, since the gap between the head having the guide vanes and the pressure connector need not be absolutely tight. Furthermore, a set of teeth between the head and the connector may also be envisioned for joining the guide vane head on the lower ring area of the pressure connector.

DETAILED DESCRIPTION OF THE INVENTION

Figure 1:
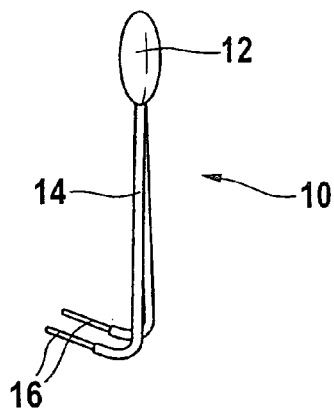
FIG. 1 shows a temperature sensor designed as an NTC.

A temperature sensor designed in particular as an NTC element is seen in the representation according to FIG. 1.

As FIG. 1 shows, temperature sensor 10 includes a head 12 having connecting pins 16 for signal transmission. Temperature sensor 10, designed as an NTC element, is a temperature-dependent resistor which varies with the temperature. Head 12 of temperature sensor 10 is normally manufactured as a smooth, large glass or plastic bead having a diameter of approximately 1 mm to 3 mm.

Figure 2:
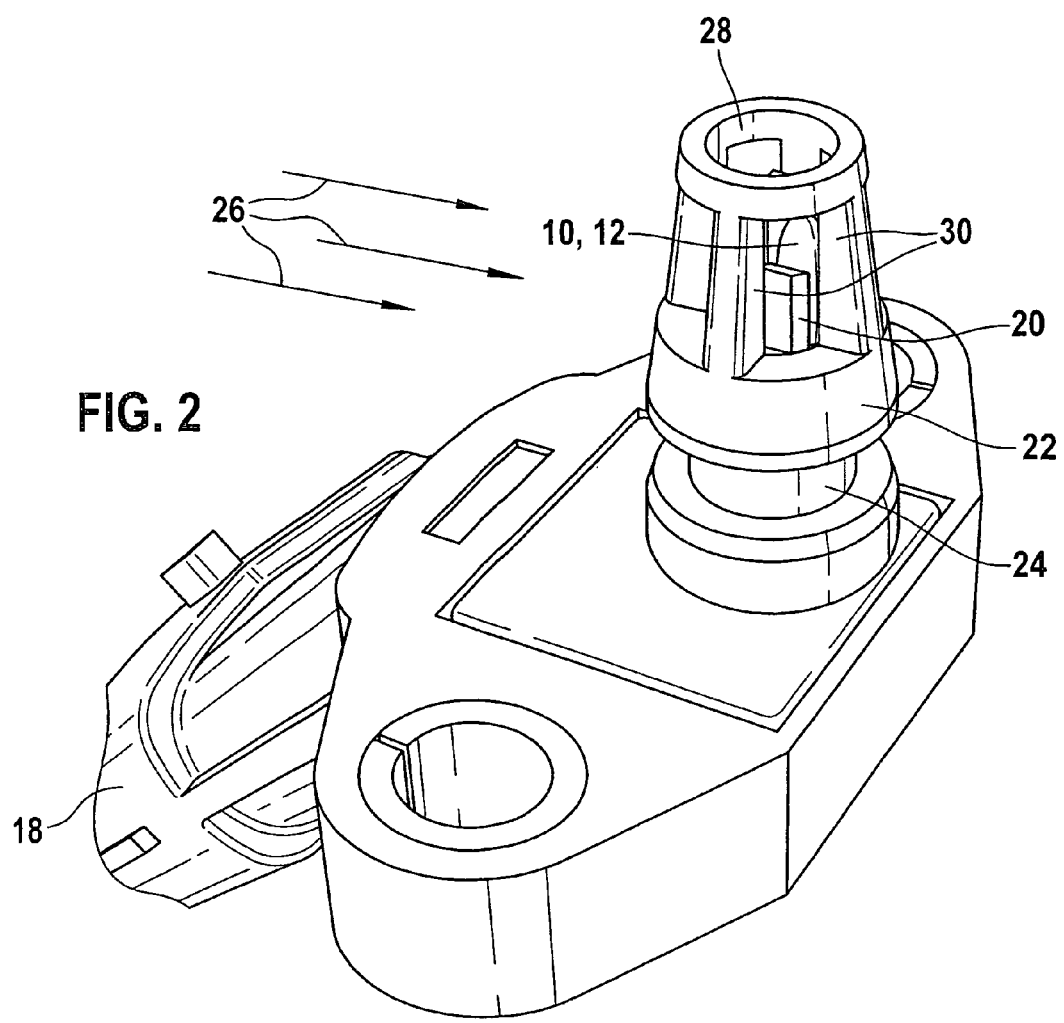
FIG. 2 shows a pressure connector having a support for the temperature sensor according to the present related art.

The representation according to FIG. 2 shows a part of a sensor housing having a pressure connector formed on it, temperature sensor 10 being embedded in the pressure connector.

The representation according to FIG. 2 shows that temperature sensor 10 which, as already indicated in FIG. 1, is extremely sensitive mechanically, is enclosed by a support 20 on pressure connector 22, which is part of a sensor housing 18. As represented in FIG. 2, temperature sensor 10, which is exposed to an incident flow 26, is surrounded by a cage having ribbing 30. The upper ends of ribbing 30 merge into a ring 28 of the cage. Pressure connector 22, which is a part of sensor housing 18, and is generally manufactured as a plastic injection molded part, has a circumferential groove 24 into which a sealing ring is placed. The system of temperature sensor 10 as represented in FIG. 2 and support 20 provided there make the temperature sensor very well mechanically protected and supported in particular. Incident flow 26 easily transmits flow-induced vibrations to temperature sensor 10, so that the mechanical stresses of connecting pins 16 would be relatively high without protection. To prevent the connecting leads from breaking, temperature sensor 10 must be supported. Due to this protection, the heat transfer from air to temperature sensor 10 is very weak; on the one hand, temperature sensor 10, designed in particular as an NTC element, is thermally very well connected to thermally inert sensor housing 18 and on the other hand, incident flow 26 is almost completely screened by ribbing 30 as represented in FIG. 2.

Figure 3:
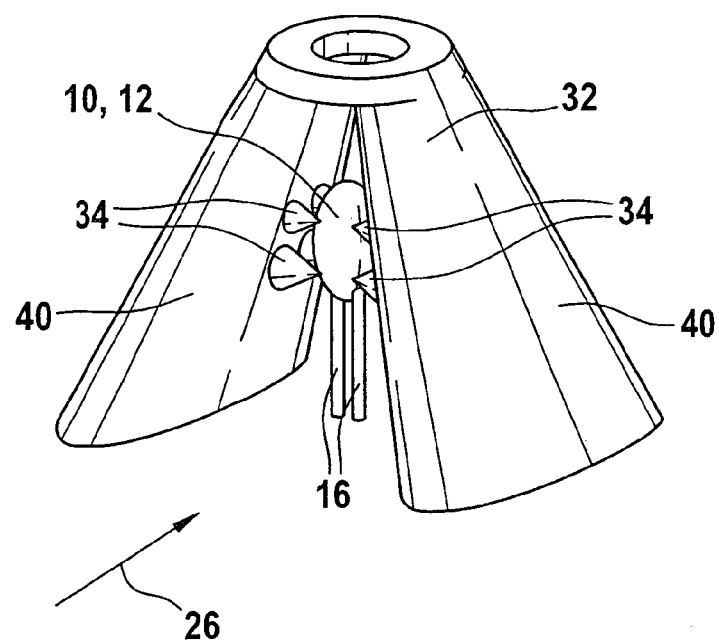
FIG. 3 shows an embodiment variant of a protective cage surrounding the temperature sensor.

In a first embodiment variant of the approach proposed according to the present invention, which is represented in FIG. 3, temperature sensor 10 is surrounded by a cage 32 which, however, is open in the direction of incident flow 26. As is evident from the perspective representation according to FIG. 3, cage 32 has braces 40 which flank temperature sensor 10 and which in particular in the area of head 12 of temperature sensor 10, designed in particular as an NTC element, are located at a short distance from it. FIG. 3 shows that cage 32 in this embodiment variant 2 has braces 40 positioned in the form of an inverted V. In the upper area of cage 32, the inner faces of braces 40 are situated closer to the circumference of head 12 compared to the base area of braces 40 which are shaped as guide vanes.

Figure 4:
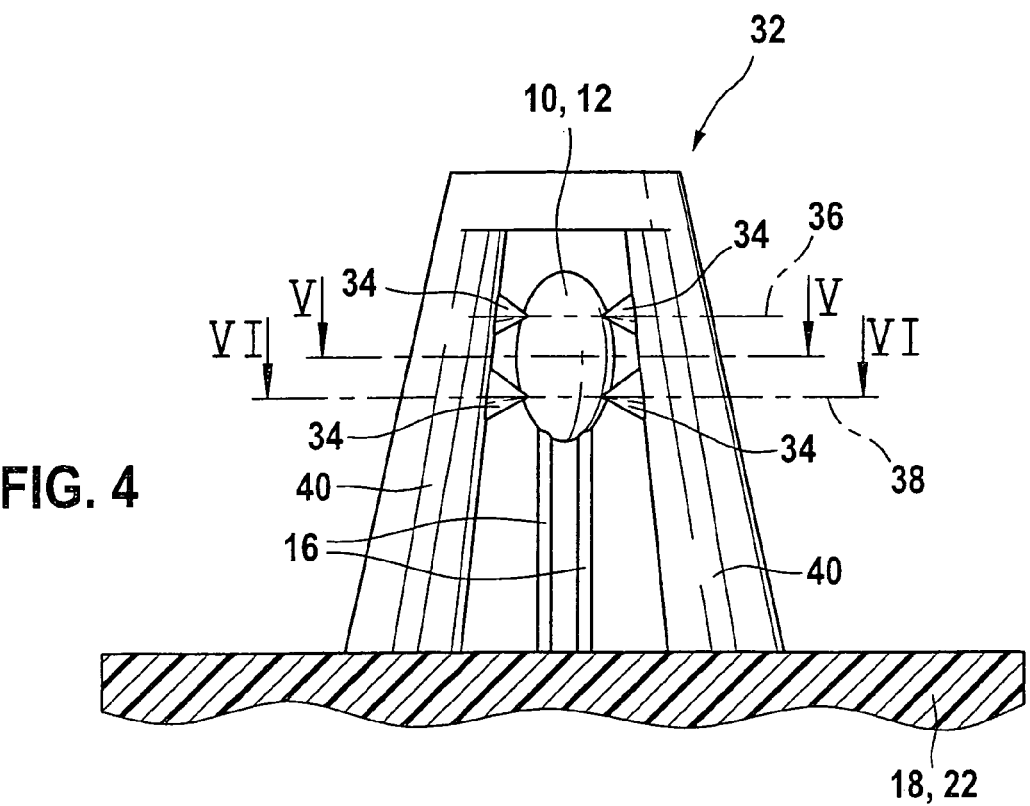
FIG. 4 shows the protective cage represented in FIG. 3, seen in the flow direction.

FIG. 4 shows the cage, as rendered in a perspective representation in FIG. 3, from the incident flow side.

As represented in FIG. 4, braces 40 of cage 32 used as guide vanes are situated in an inverted V shape and flank temperature sensor 10. Fixing projections 34 are located on the inner face of braces 40. In a particularly advantageous manner, fixing projections 34 may be manufactured to be peaked, so that the peaked fixing projections only contact the circumference of head 12 of temperature sensor 10 at points. On the one hand, this ensures that head 12 of temperature sensor 10, which is designed in particular as an NTC element, is mechanically secured within cage 32 against the flow and on the other hand, the thermal connection of head 12 of temperature sensor 10 to sensor housing 18 is very weak due to the peaked fixing projections.

The representation according to FIG. 4 furthermore shows that fixing projections 34 may, for example, be designed in pairs diametrically opposed in a first plane 36 and in a second plane 38. If cage 32 is manufactured from injection molded material, fixing projections 34 may be injected very simply on the inner face of braces 40 used as guide vanes in one work step.

Figure 5:
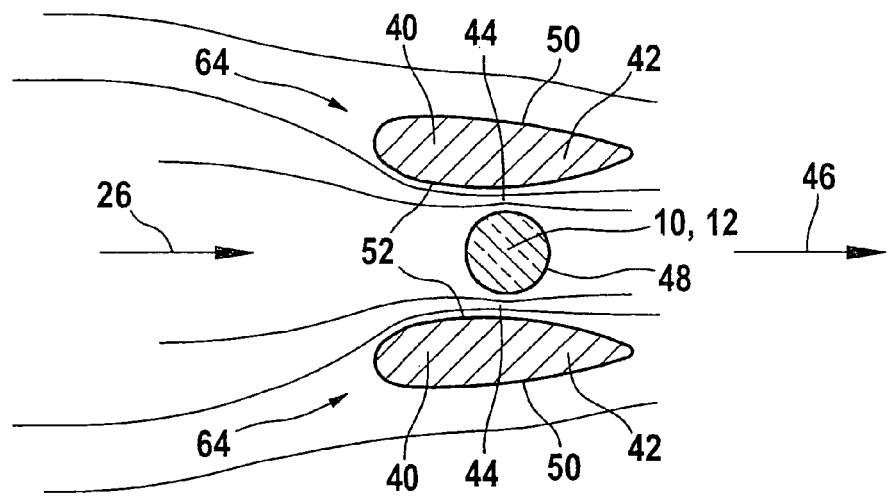
FIG. 5 shows a section line according to section line V-V in FIG. 4.
Figure 6:
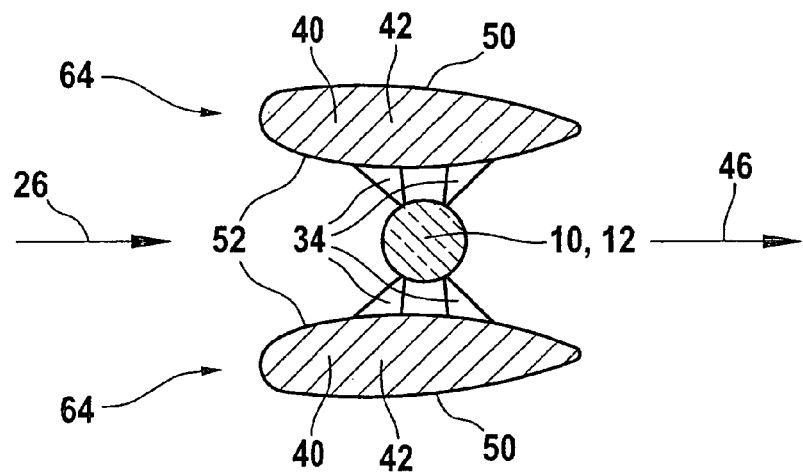
FIG. 6 shows a section line according to section line VI-VI in FIG. 4.

The representations according to FIGS. 5 and 6 show sections through the system represented in FIG. 4 in the incident flow direction and the cage system represented in perspective in FIG. 3.

From the section line according to FIG. 5 (see section line V—V in FIG. 4), it is evident that in this section plane above first plane 36 according to FIG. 4, incident flow 26 is accelerated in the area of a circumference 48 of head 12 of temperature sensor 10 due to the reduction of the distance between inner faces 52 of braces 40 used as guide vanes. The cause of this is that braces 40 used as guide vanes have a profile 64 in the shape of a droplet. A cross section 42 of braces 40 of cage 32 which are used as guide vanes has the shape of an airplane wing profile, a rounded inner face 52 and a rounded outer face 50. Outer face 50 need not necessarily be profiled; in the present connection, the profile of inner face 52 is more substantial. Profile 64 of side 52 facing circumference 48 of head 12 of temperature sensor 10 results in a specific acceleration of incident flow 26 and higher flow rates occurring as a result of this, which in turn make it possible to improve the heat transfer from the medium to head 12 of temperature sensor 10 and consequently reduce the response times. If it is simultaneously ensured that temperature sensor 10, of which only head 12 is shown in the sectional representation according to FIG. 5, has a weak thermal connection to sensor housing 12, or is thermally decoupled from the sensor housing, further improved measurement results are delivered.

FIG. 6 shows section line VI—VI according to FIG. 4. The section plane according to FIG. 6 lies in the area of fixing projections 34, as seen in FIG. 6. These fixing projections are formed in pairs on inner faces 52 of braces 40 used as guide vanes diametrically opposed in relation to incident flow 26. As is further evident from FIG. 6, pairs of fixing projections 34 may also be positioned one after the other on inner face 52, seen in the flow direction. In addition to the flow acceleration in the area of head 12 of temperature sensor 10, cage 32, of which only braces 40 used as guide vanes are indicated in the sectional representations according to FIGS. 5 and 6, offers an important protective function for temperature sensor 10. Fixing projections 34 attached to inner face 52 of braces 40 used as guide vanes are used to hold head 12 of temperature sensor 10 and prevent flow-induced vibrations. The representation according to FIG. 6 shows that circumference 48 of head 12 of temperature sensor 10 is contacted only by point contact of the points of fixing projections 34 designed as a fixing mandrel. The point contact of the points of fixing projections 34—designed as a fixing mandrel—results in a weak thermal connection of head 12 of temperature sensor 10 to cage 32 or to sensor housing 18 which is connected to the cage.

The representation according to FIG. 6 shows that cross-section 42 of braces 40 used as guide vanes has profile 64 in droplet shape. Braces 40 have a rounded shape on their inner face 52 facing the circumference of head 12 of temperature sensor 10, so that an accelerated flow is achieved similar to the representation according to FIG. 5. While reference numeral 26 denotes the incident flow of head 12 of temperature sensor 10, reference numeral 46 denotes the outflow of the medium, the temperature of which must be detected.

Figure 7:
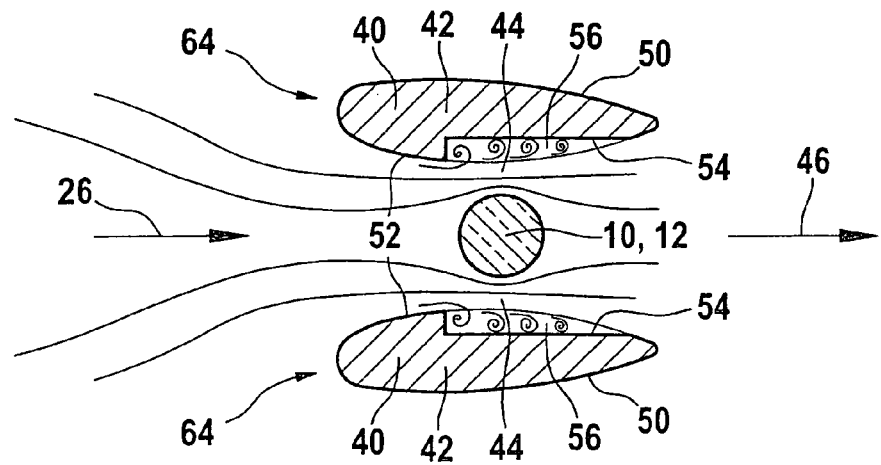
FIG. 7 shows an embodiment variant of the profiled guide vanes representing lateral braces of the protective cage.

The representation according to FIG. 7 shows another embodiment variant of the idea underlying the present invention.

From FIG. 7, it is evident that sharp-edged recesses 54 are formed in the area of head 12 of temperature sensor 10 on inner face 52 of braces 40 of cage 32 used as guide vanes. These recesses form a separation area 56 on the face of braces 40 of cage 32 used as guide vanes facing head 12 of temperature sensor 10. Recesses 54 on inner face 52 of braces 40 of cage 32 used as guide vanes are situated in a zone in which very high flow rates already prevail. The embodiment variant according to FIG. 7 ensures that incident flow 26 may be kept at a continued high rate level and simultaneously the distance between inner face 52 and brace 40 used as a guide vane and circumference 48 of head 12 of temperature sensor 10 is increased, so that the thermal connection is affected.

The width of braces 40 used as guide vanes ranges between 5 mm and 12 mm while the thickness of the braces perpendicular to incident flow 26 may range between 1 mm and 3 mm.

Figure 8:
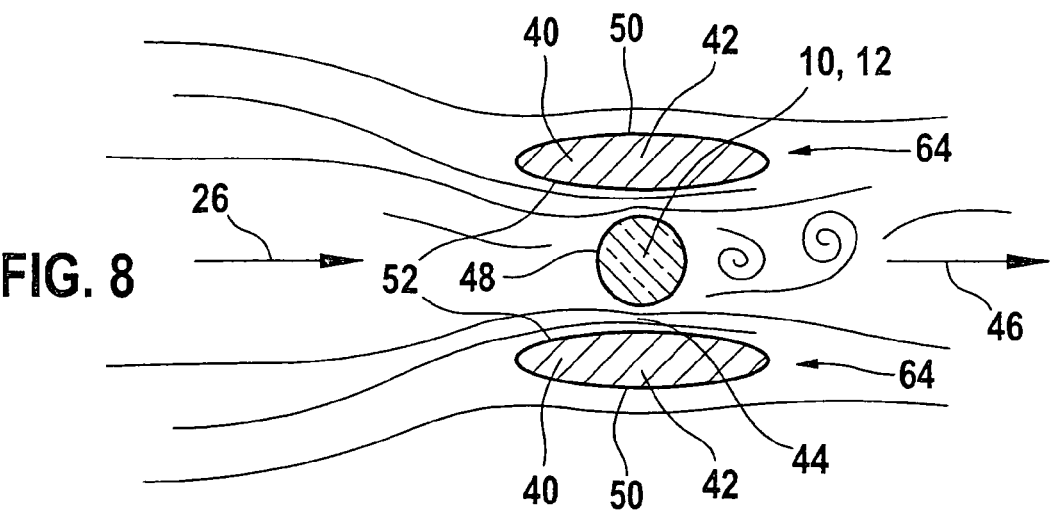
FIG. 8 shows a favorable incident flow of the head of the temperature sensor flanked by guide vanes.
Figure 9:
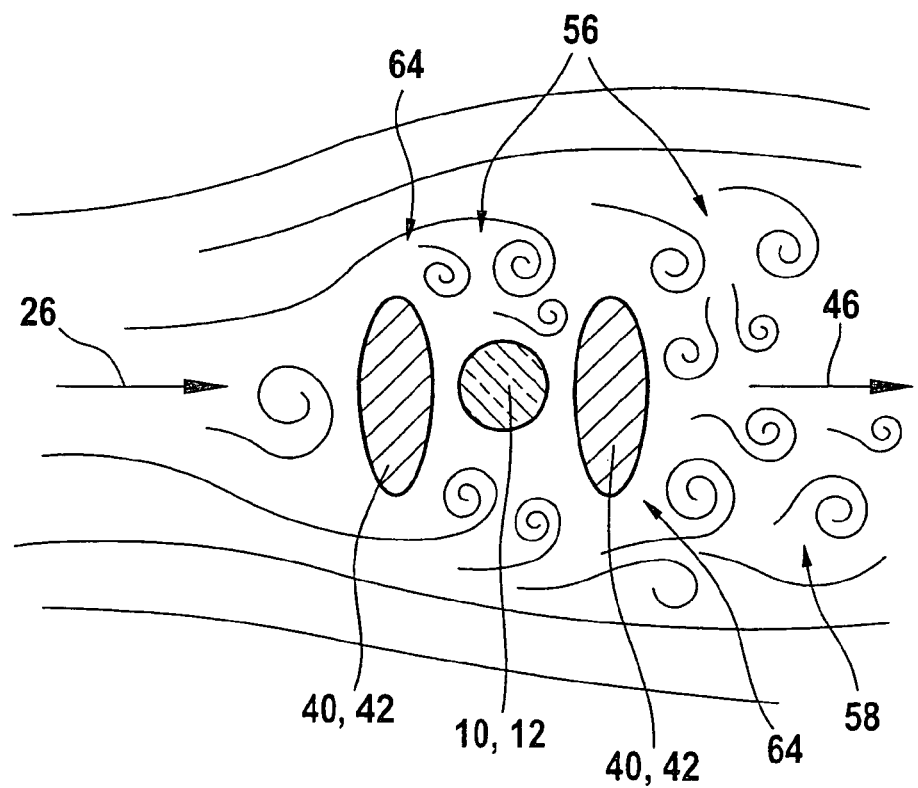
FIG. 9 shows a more unfavorable incident flow of the NTC used as a temperature sensor, in contrast to the representation according to FIG. 8.

The embodiment variants according to FIGS. 8 and 9 show incident flow scenarios of a temperature sensor in greater detail. FIG. 8 shows a favorable incident flow of head 12 of temperature sensor 10, braces 40 of cage 32 used as guide vanes according to FIGS. 3 and 4 being oriented in the flow direction in relation to incident flow 26. Deviations in the parallel position of braces 40 having a droplet-shaped profile 64 are tolerable in the range between 5° and 10°. In the incident flow variant represented in FIG. 8, accelerated flow 44 arises due to the parallelism of incident flow 26 with the profile of braces 40 used as guide vanes between inner face 52 of braces 40 used as guide vanes and circumference 48 of head 12, this accelerated flow being transformed into outflow 46. In the embodiment variant according to FIG. 8, which shows a favorable incident flow scenario, the profile of outer face 50 of braces 40 used as guide vanes is of minor significance; of sole importance is the achievement of accelerated flow 44 in the area of head 12 of temperature sensor 10, as represented in FIG. 8.

In contrast, FIG. 9 shows an unfavorable incident flow variant, braces 40 of cage 32 used as guide vanes, as represented in FIGS. 3 and 4, being perpendicular to the direction of incident flow 26 and perpendicular to outflow 46. This results in a flow deflection, so that head 12 of temperature sensor 10 in the unfavorable incident flow scenario represented in FIG. 9 is more likely to be screened from incident flow 26 than exposed to it. The consequence of this is the formation of separation areas 56 which are transformed into a vortex street 58 downstream from incident flow 26. Outflow 46 is an outflow 46 in the form of a vortex street having accordingly worsened flow characteristics.

Figure 10:
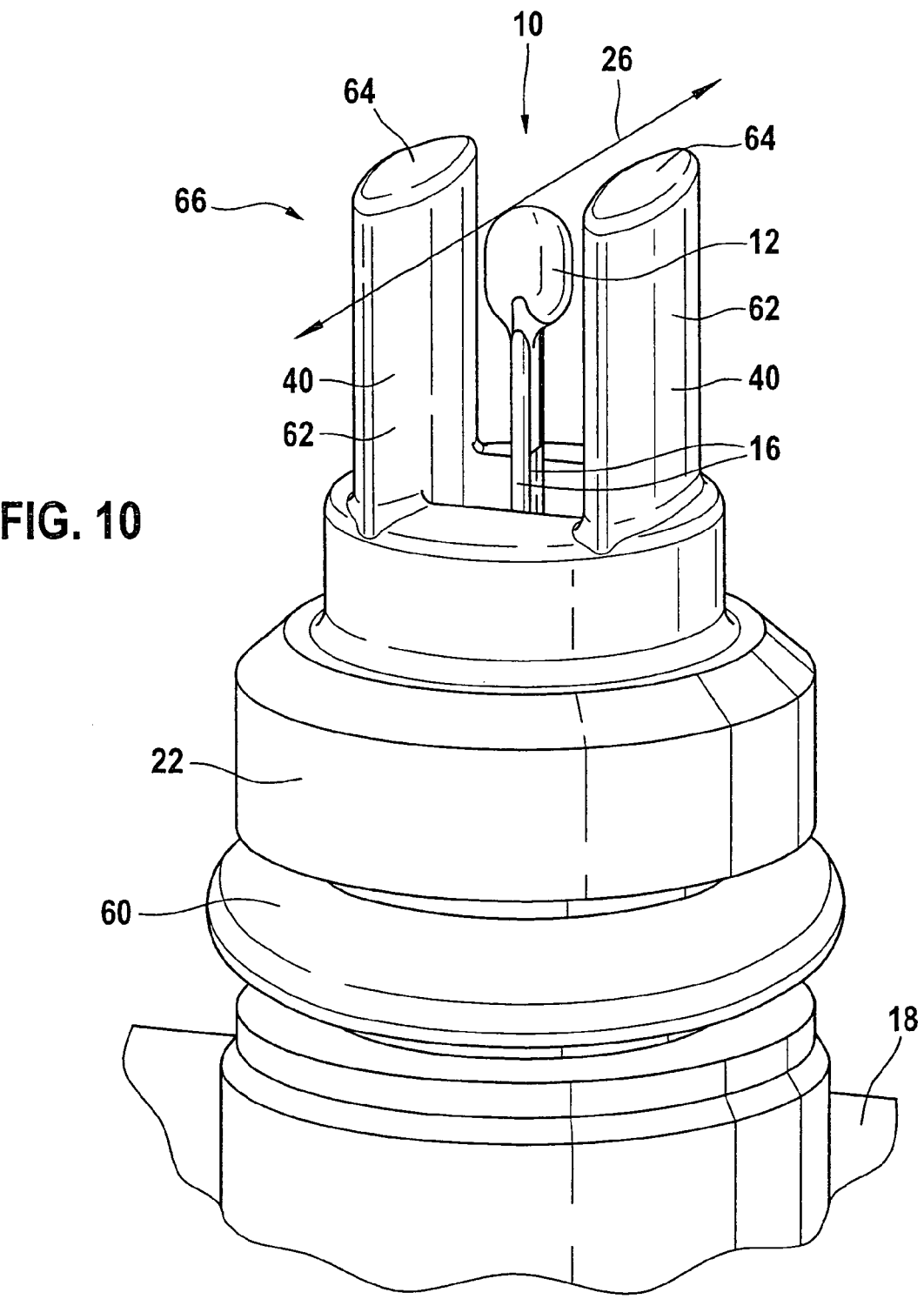
FIG. 10 shows an embodiment variant of a pressure connector on a sensor housing having aerodynamic guide vanes.

FIG. 10 shows an embodiment variant of the approach proposed according to the present invention in which a guide vane head is used instead of a cage 32 having a fixed orientation as represented in FIGS. 3 and 4.

Pressure connector 22 is formed on sensor housing 18, a guide vane head being attached to the pressure connector in the representation according to FIG. 10. This guide vane head includes two guide vanes 62 having a profile 64 which corresponds to cross-section 42 of braces 40 of cage 32 used as guide vanes (see sectional representation according to FIGS. 5, 6 and 7). Temperature sensor 10 is accommodated in the center of guide vane head 66, head 12 of the temperature sensor being located between the ends of guide vanes 62. Incident flow 26 or outflow 46 proceed in the direction of the double arrow, so that profile 64 of guide vanes 62, as indicated in FIG. 10, causes a specific acceleration of incident flow 26 in the area of head 12 of temperature sensor 10, resulting in accelerated flow 44, hence it being possible to achieve an improved heat transfer and shorter response times of temperature sensor 10.

The representation according to FIG. 10 furthermore shows that a sealing ring 60 designed, for example, as an O-ring may be embedded into circumferential groove 24 represented in FIG. 2. The connection between guide vane head 62 and the pressure connector on sensor housing 18 which is concealed by it in FIG. 10 may be established, for example, by way of an integral joining method such as, for example, laser welding or friction welding. The possibility also exists to slip guide vane head 66 including guide vanes 62 formed on it onto pressure connector 22 on sensor housing 18 or to clip it on or fasten it to a set of teeth. Depending on the direction of incident flow 26, which is extremely important in relation to the orientation of guide vanes 62 of guide vane head 66, the exact angle position of guide vane head 62 in relation to pressure connector 22 designed to be stationary on sensor housing 18 may be selected before the integral joining as a function of the orientation of incident flow 26, so that guide vane head 66 may be attached in a favorable, well defined angle position for the respective application.

If a set of teeth is provided between the lateral surface of pressure connector 22 and the inner face of guide vane head 66, the angle position of guide vane head 66 may also be adjusted in order to improve the incident flow characteristic of head 12 of temperature sensor 10 which is in particular designed as an NTC element.

Figure 11:
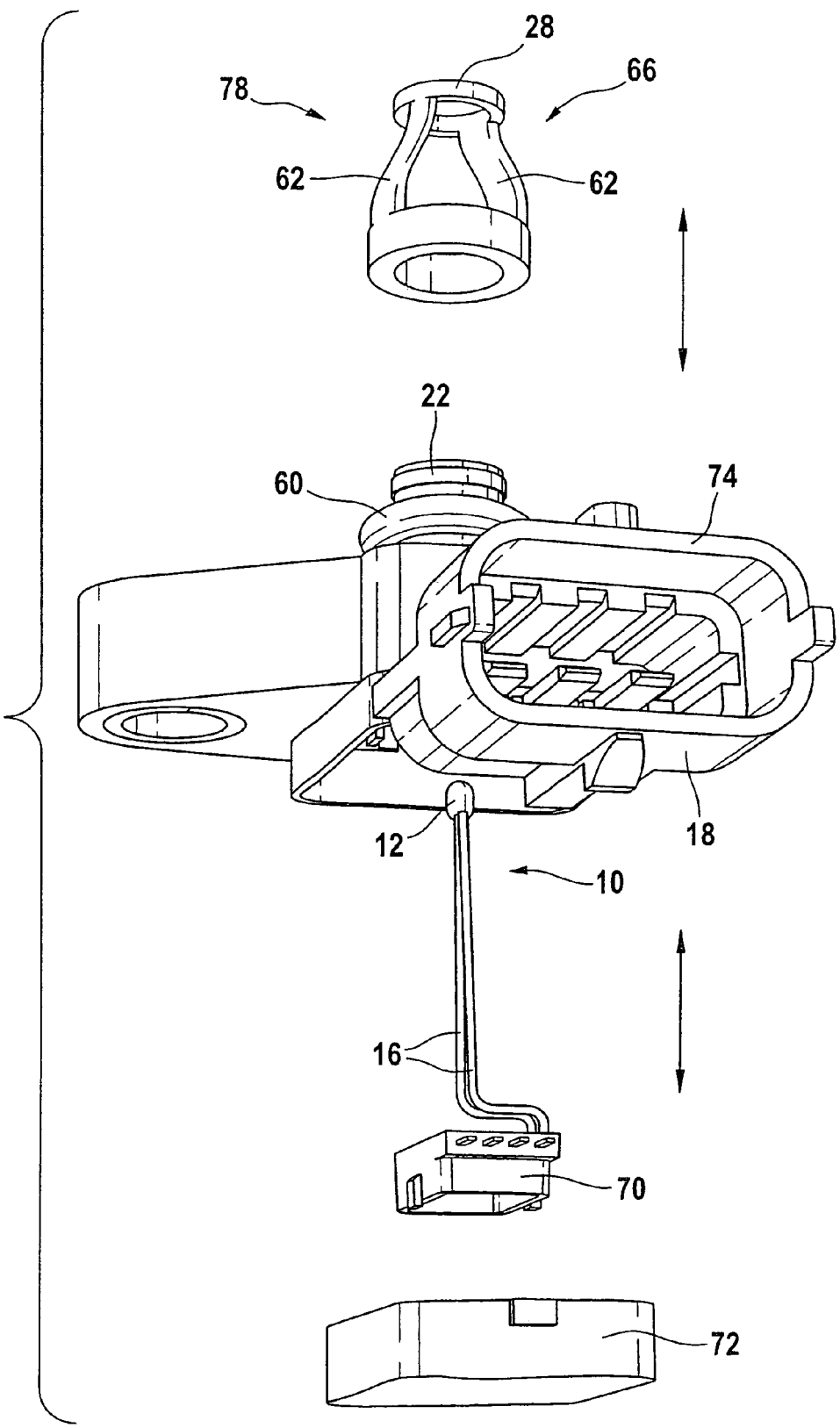
FIG. 11 shows an exploded view of the pressure sensor.

The representation according to FIG. 11 shows an exploded view of a sensor according to the present invention.

After temperature sensor 10 designed in particular as an NTC element is joined to a sensor module 70, a premounted assembly is produced. An adhesive is introduced into sensor housing 18, in particular in the area in which pressure connector 22 is located. The premounted assembly made up of sensor module 70 and connecting pins 16 connected to it electrically is inserted into a cavity 80 (see representation according to FIG. 12) of pressure connector 22. In this connection, sensor module 70 is sealed in sensor housing 18 on the one hand, and connecting pins 16 of temperature sensor 10 are sealed on the other hand. O-ring 60 is then placed (see representation according to FIG. 10) into circumferential groove 24 on the lateral surface of pressure connector 22 as represented in FIG. 2. This is followed by the mounting of guide vane head 66 which has a conical shape in the representation according to FIG. 11 and which is integrally joined to pressure connector 22 in a corresponding angle position optimizing the incident flow of head 12 of temperature sensor 10. Guide vane head 66 has two or more guide vanes 62 which may merge into a ring 28 of guide vane head 66 on the incident flow side. If guide vane head 66, surrounding premounted head 12 of temperature sensor 10, is placed on the lateral surface of pressure connector 22 in a correct angle position, guide vane head 66 is integrally joined to the jacket of pressure connector 22. This may be done using one of the above-mentioned integral joining methods such as, for example, laser welding or friction welding; instead of the mentioned integral joining method, guide vane head 66 may also be slipped onto the jacket of pressure connector 22, clipped to it or slipped onto a set of teeth placed on the lateral surface of pressure connector 22.

Figure 12:
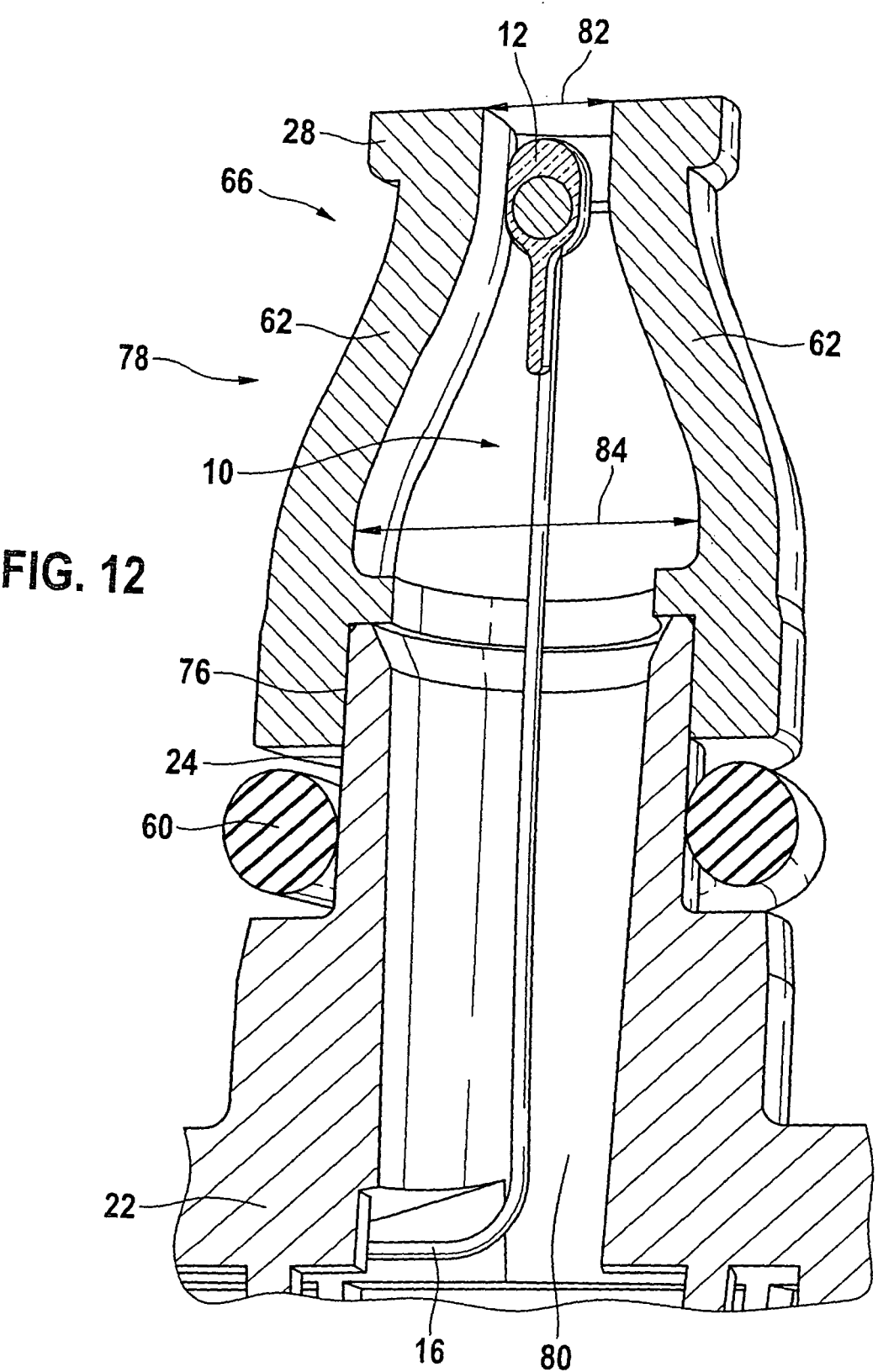
FIG. 12 shows a sectional representation of the guide vane head having the pressure connector and the temperature sensor designed as an NTC surrounded by the guide vane head.
Figure 13:
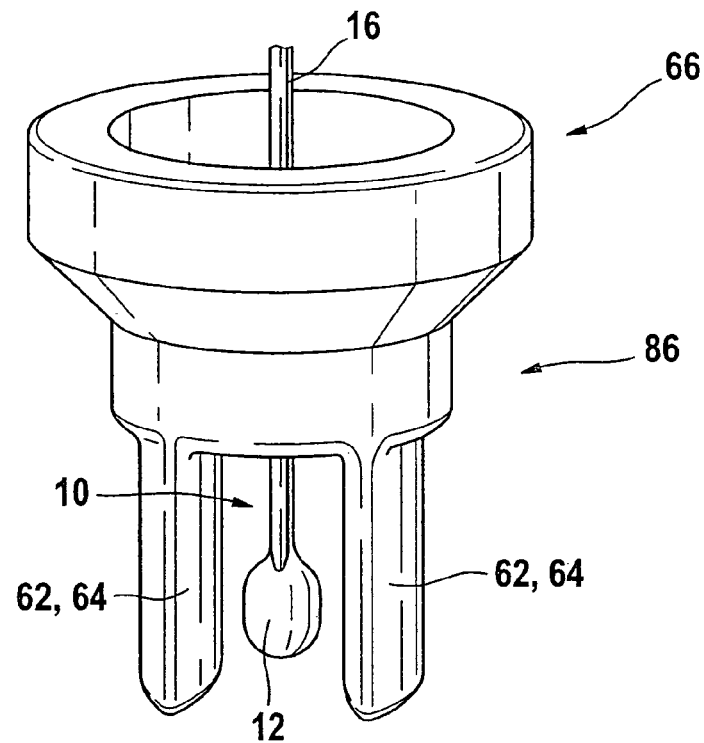
FIG. 13 shows a cylindrical embodiment variant of the guide vane head manufactured as an injection molded part.
Figure 14:
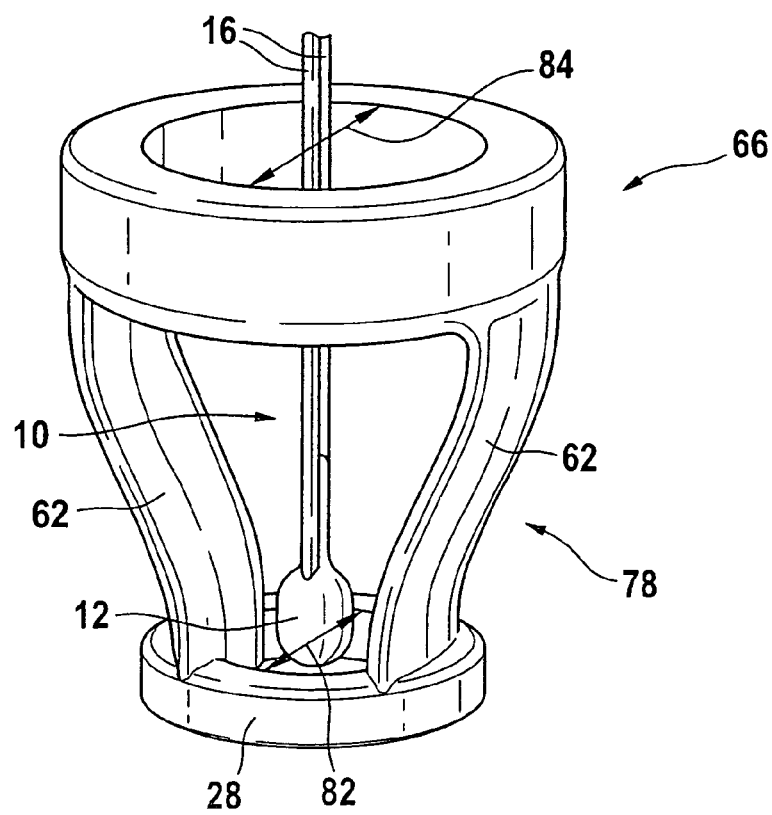
FIG. 14 shows the conical variant of the guide vane head represented in section mounted on the pressure connector in FIG. 12.

The representation according to FIGS. 12, 13 and 14 show embodiment variants and mounting variants of the guide vane head on pressure connector 22 of sensor housing 18.

As already mentioned in connection with the mounting method in FIG. 11, the premounted assembly of sensor module 70 and accordingly electrically connected connecting pins 16 of temperature sensor 10 is mounted in sensor housing 18 in such a way that head 12 projects freely through cavity 80 of pressure connector 22. During the mounting process, connecting pins 16 are sealed in pressure connector 22 by the adhesive material previously introduced into it. It is generally the case that the NTCs are first mounted in or on the pressure connector, followed by the installation of the head having the guide vanes.

The representation according to FIG. 12 now shows that guide vane head 66 may have a conicity 78.

Continuing to follow the basic idea of the present invention, guide vane head 66 has a first diameter 82 in the area in which it surrounds head 12 of temperature sensor 10 designed as an NTC element, this diameter being smaller than a second diameter 84 which guide vane head 66 has in mounting area 76 on the lateral surface of pressure connector 22. As already mentioned, mounting location 76 may be designed as an integral connection. Laser welding or friction welding may be used in particular for this purpose after guide vane head 66 is brought into the optimal angle position with respect to the incident flow of head 12 of temperature sensor 10. Since the inner faces of guide vanes 62 are significantly closer to the circumference of head 12 of temperature sensor 10 in the area of first diameter 82, a higher flow rate arises in this area which makes a significantly improved heat transfer possible.

Second diameter 84, which significantly exceeds first diameter 82, is preferably similar to the diameter in which pressure connector 22 is formed on sensor housing 18. The sectional representation according to FIG. 12 furthermore shows that sealing ring 60, which may be designed as an O-ring, has been embedded into circumferential groove 24 on pressure connector 22. FIG. 12 furthermore shows that, in contrast to the representation according to FIG. 10, guide vane head 66 has a conical shape 78 in this embodiment variant compared to the cylindrical shape in which guide vane head 66 is designed in the representation according to FIG. 10.

For stabilizing guide vanes 62, they are connected to one another by a ring structure 28 at their end area, i.e., the area in which incident flow 26 impacts guide vane head 66.

The representations according to FIGS. 13 and 14 show embodiment variants of guide vane head 66 shown in FIG. 10 and FIG. 12 in longitudinal section.

The representation according to FIG. 13 shows guide vane head 66, as it is shown in the representation according to FIG. 10, where it is attached to pressure connector 22 of sensor housing 18. The representation according to FIG. 13 shows that guide vanes 62, each provided with profile 64 in droplet shape, extend essentially parallel to one another. Guide vane head 66 according to the embodiment variant in FIG. 13 has a cylindrical shape 86. Guide vanes 62 provided with profile 64 in droplet shape accelerate the medium due to the cross-sectional restriction formed between the inner face of guide vanes 62 and circumference 48 of head 12 of temperature sensor 10 designed as an NTC element. The angle position in which guide vane head 66 shown in FIG. 13 is preferably attached to pressure connector 22 must be selected in such a way that profiles 64, preferably designed in droplet shape, of individual guide vanes 62 extend essentially parallel to the flow direction of incident flow 26.

The representation according to FIG. 14 shows the configuration of guide vane head 66 shown in FIGS. 11 and 12 having a conical shape 78 in each case. While ring 28 extends in the area of ring 28 on the underside of guide vanes 62, guide vanes 62 proceed from first diameter 82 in the direction of second diameter 84 while continuously widening. Due to first diameter 82, guide vanes 62 are closer to circumference 48 of head 12 of temperature sensor 10 in the area of ring 28, so that higher flow rates and accordingly a strongly improved heat transfer may be achieved in the area of head 12 of temperature sensor 10, which is in particular designed as an NTC element.

What is claimed is:

1. A device for fixing a temperature sensor in a sensor housing, the device comprising:
   at least two guide vanes located in a pressure connector section of the sensor housing,
   wherein the two guide vanes are configured to flank a head of the temperature sensor and each have a curved surface at least partially facing and curved toward the head of the temperature sensor to accelerate an incident flow in the area of the head of the temperature sensor and in a direction substantially perpendicular to a longitudinal axis of connecting pins of the temperature sensor.

2. The device as recited in claim 1, wherein each guide vane includes first and second opposite facing surfaces each exposed to respective first and second portions of the incident flow travelling in a substantially same direction.

3. The device as recited in claim 1, wherein the curved surface has a convex curvature.

4. The device as recited in claim 1, wherein the at least two guide vanes include a maximum of two guide vanes.

5. The device as recited in claim 1, wherein the curved surface forms a profile of the respective guide vane configured to cause the incident flow to be accelerated on a side of the respective guide vane facing the head of the temperature sensor.

6. The device as recited in claim 5, wherein the guide vanes each have a droplet shape cross section.

7. The device as recited in claim 1, wherein the two guide vanes are part of one of (i) a cage or (ii) a guide vane head.

8. The device as recited in claim 7, wherein one of the pressure connector or the guide vane head is rotatably situated in relation to the sensor housing.

9. The device as recited in claim 7, wherein the guide vane head is one of (i) welded to the pressure connector of the sensor housing, (ii) slipped onto the pressure connector, (iii) clipped onto the pressure connector, or (iv) mounted on a set of teeth on a jacket of the pressure connector.

10. The device as recited in claim 7, wherein the guide vane head has one of a conical shape or a cylindrical shape.

11. The device as recited in claim 10, wherein the guide vane head has a conical shape with a first diameter and a second diameter exceeding the first diameter, the first diameter being situated in the area of the head of the temperature sensor.

12. A device for fixing a temperature sensor in a sensor housing, the device comprising:
at least two guide vanes located in a connector section of the sensor housing,
wherein the two guide vanes are configured to flank a head of the temperature sensor and accelerate an incident flow in the area of the head of the temperature sensor, the two guide vanes each having a recess on a respective side facing the temperature sensor, the recess configured to form a separation area of the incident flow, the separation area producing at least one vortex in the incident flow.

13. The device as recited in claim 12, wherein each separation area is (i) situated in a region of highly accelerated incident flow and (ii) configured to weaken a thermal connection of the head of the temperature sensor to the guide vanes.

14. The device as recited in claim 12, wherein the recess faces the head of the temperature sensor.

15. The device as recited in claim 12, wherein the two guide vanes are part of one of (i) a cage or (ii) a guide vane head.

16. The device as recited in claim 15, wherein one of the pressure connector or the guide vane head is rotatably situated in relation to the sensor housing.

17. The device as recited in claim 15, wherein the guide vane head has one of a conical shape or a cylindrical shape.

18. The device as recited in claim 15, wherein the guide vane head has a conical shape with a first diameter and a second diameter exceeding the first diameter, the first diameter being situated in the area of the head of the temperature sensor.

19. The device as recited in claim 15, wherein the guide vane head is one of (i) welded to the pressure connector of the sensor housing, (ii) slipped onto the pressure connector, (iii) clipped onto the pressure connector, or (iv) mounted on a set of teeth on a jacket of the pressure connector.

20. A device for fixing a temperature sensor in a sensor housing, the device comprising:
at least two guide vanes located in a connector section of the sensor housing,
wherein the two guide vanes are configured to support a head of the temperature sensor and accelerate an incident flow in an area of the head of the temperature sensor, the two guide vanes each having at least one fixing projection on a respective side facing the head of the temperature sensor, the fixing projection contacting the head of the temperature sensor.

21. The device as recited in claim 20, wherein each fixing projection is a fixing mandrel forming a point contact with the head of the temperature sensor.

22. The device as recited in claim 20, wherein the fixing projections are situated in at least two planes extending substantially perpendicular to the sides of the guide vanes facing the head of the temperature sensor.

23. The device as recited in claim 20, wherein the two guide vanes are part of one of (i) a cage or (ii) a guide vane head.

24. The device as recited in claim 23, wherein one of the pressure connector or the guide vane head is rotatably situated in relation to the sensor housing.

25. The device as recited in claim 23, wherein the guide vane head has one of a conical shape or a cylindrical shape.

26. The device as recited in claim 23, wherein the guide vane head has a conical shape with a first diameter and a second diameter exceeding the first diameter, the first diameter being situated in the area of the head of the temperature sensor.

27. The device as recited in claim 23, wherein the guide vane head is one of (i) welded to the pressure connector of the sensor housing, (ii) slipped onto the pressure connector, (iii) clipped onto the pressure connector, or (iv) mounted on a set of teeth on a jacket of the pressure connector.

* * * * *